United States Patent [19]

Graham et al.

[11] 3,710,026

[45] Jan. 9, 1973

[54] INTERCONNECTED LOOP DIGITAL TRANSMISSION SYSTEM

[75] Inventors: Ronald Lewis Graham, Chatham; Henry Otto Pollak, Summit, both of N.J.

[73] Assignee: Bell Telephone Laboratories, Incorporated, Murray Hill, Berkeley Heights, N.J.

[22] Filed: March 1, 1971

[21] Appl. No.: 119,724

[52] U.S. Cl. ..........179/15 AL
[51] Int. Cl. ..........H04j 3/08
[58] Field of Search ..........179/15 AL; 340/172.5

[56] References Cited

OTHER PUBLICATIONS

IRE Transactions on Communication Systems; "Communication Network for Digital Information"; December 1960, pp. 207–214; by J. M. Unk.

*Primary Examiner*—Kathleen H. Claffy
*Assistant Examiner*—David L. Stewart
*Attorney*—R. J. Guenther and William L. Keefauver

[57] ABSTRACT

A digital communication loop system is disclosed wherein transfers of signal message blocks between intersecting loops are only made when a Hamming distance criterion is satisfied. More particularly, a decision to switch from one loop to another interconnecting loop is made when the Hamming distance between the interconnecting loop address and the final destination loop address is less than the Hamming distance between the loop address in which the message block currently resides and the final destination loop address.

17 Claims, 15 Drawing Figures

INVENTORS: R.L. GRAHAM
H.O. POLLAK
BY Gerard E. Murphy
ATTORNEY

FIG. 8A
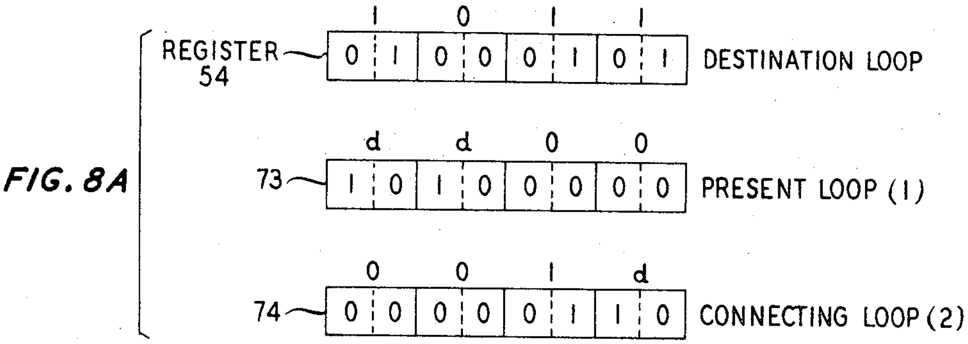
FIG. 8B
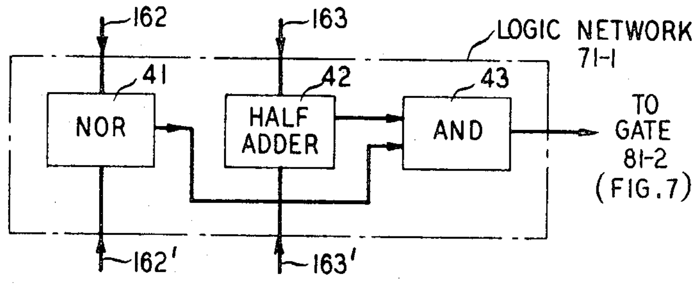
FIG. 9A
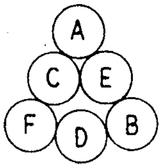
FIG. 9B
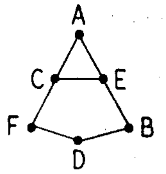
FIG. 9C
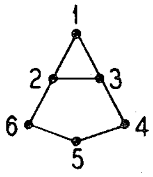
FIG. 9D
V(j) across the top, V(i) down the side:
| V(i) \ V(j) | 1 | 2 | 3 | 4 | 5 | 6 |
|---|---|---|---|---|---|---|
| 1 | 0 | 1 | 1 | 2 | 3 | 2 |
| 2 | 1 | 0 | 1 | 2 | 2 | 1 |
| 3 | 1 | 1 | 0 | 1 | 2 | 2 |
| 4 | 2 | 2 | 1 | 0 | 1 | 2 |
| 5 | 3 | 2 | 2 | 1 | 0 | 1 |
| 6 | 2 | 1 | 2 | 2 | 1 | 0 |

INTERCONNECTED LOOP DIGITAL TRANSMISSION SYSTEM

FIELD OF THE INVENTION

This invention pertains to digital transmission systems and, more particularly, to a digital transmission system wherein a plurality of transmission loops are interconnected by switching stations which respond to address information, positioned within each data message block, to selectively switch the message block to an interconnected loop.

BACKGROUND OF THE INVENTION

If digital information is to be exchanged between terminals separated by any substantial distance, it is generally necessary to use dedicated transmission facilities between such terminals, or to temporarily connect such terminals by common carrier, switched transmission facilities. Since it is the nature of digital data sources to require large amounts of digital channel capacity for relatively brief and unexpected periods, the available facilities described above have proven very inefficient.

Dedicated transmission facilities, for example, remain unused the vast majority of the time. With switched facilities, on the other hand, it often takes more time to set up the transmission path between terminals than is required for the entire transmission of a data message. The telephone network requires real time transmission in the sense that voice signals must be delivered substantially at the same time they are generated. It therefore is standard procedure to set up the communication path in its entirety before any signals are transmitted. As a result, centralized switching has been used in the telephone plant. Digital transmission of data, on the other hand, need not be done in real time and hence it is wasteful to set up an entire connection prior to transmission. These facts tend to make presently available interconnection facilities uneconomical for digital communications.

In the copending application of J. R. Pierce (Case 97), Ser. No. 79,185, entitled Data Block Transmission System, filed Oct. 8, 1970, a closed loop transmission system is described in which a plurality of stations have access to each loop to write messages into and read messages from standardized data message blocks transmitted around the loop. One station in each loop provides for regeneration of all message blocks. The various loops are interconnected by switching stations which respond to address information, conveniently located at the head or beginning of each message block, to selectively switch the block to an interconnected loop. This is accomplished by detecting address information, i.e., a destination code, and switching the message block to an interconnecting loop when the code indicates a destination on a loop different from the one on which the message block is currently circulating. This reliance on a difference criterion as the basis for a switching interconnection, though eminently suitable in many applications, is highly inefficient in many others. Ideally, a message block should traverse a minimum number of loops in its journey between a data source and a predestined data receiver.

It is an object of the present invention to provide improved digital transmission facilities for communication between digital facilities.

It is a more specific object of the present invention to improve the efficiency and economy of digital transmission in an interconnecting loop transmission system.

It is another object of this invention to selectively address each loop in a transmission system to minimize the total transmission path traversed by a data message block.

SUMMARY OF THE INVENTION

These and other objects are achieved, in accordance with this invention, by designating each loop with a predetermined *n*-bit binary address. A decision to switch from one loop to another interconnecting loop is made when the Hamming distance between the interconnecting loop address and the final destination loop address is less than the Hamming distance between the loop address in which the message block currently resides and the final destination loop address. Colloquially, an exit is made from one loop to another if and only if it decreases the Hamming distance between where you are and where you want to go. In a particular embodiment, the number of loops traversed is exactly equal to the Hamming distance between source and receiver loops, with each transfer between interconnecting loops decreasing said distance by one.

BRIEF DESCRIPTION OF THE DRAWINGS

FIG. 8A depicts various loop addresses and their respective stored codes;

FIG. 8B is a block diagram of a logic network used in the circuit of FIG. 7;

FIG. 9A represents, abstractly, the communication loop system of FIG. 1;

FIGS. 9B and 9C depict the graph of the loop system of FIG. 9A with different vertex identifications; and FIG. 9D depicts the distance matrix for the graph of FIG. 9C.

DETAILED DESCRIPTION

Figure 1:
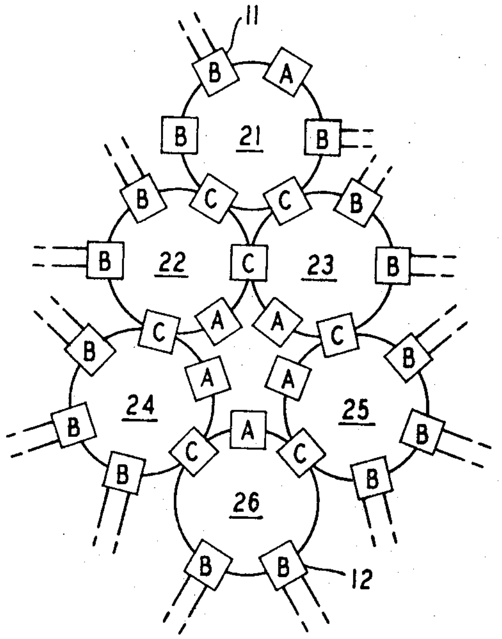
FIG. 1 depicts a general loop communication system.

In FIG. 1 there is shown a representation of an intersecting loop data transmission system. Loop 21, e.g., interconnects a plurality of loops, 22 and 23. Loops 22 and 23, each interconnect, one with the other, and also respectively interconnect with loops 24 and 25. Loops 24 and 25, in turn, interconnect with loop 26. The digital transmission system of FIG. 1 thus comprises a plurality of closed transmission loops which intersect at selected points to permit the transfer of digital messages between the loops.

Three basic digital components are shown in FIG. 1 in addition to the transmission loops themselves. A timing unit, labelled as station "A," is provided for closing each loop. The A-stations also serve to provide synchronization and timing for the associated loops. Data stations, called "B-stations," are provided on all of the loops to permit access by data sources and/or data receivers. Any number of B-stations can be included on each loop. An interconnecting unit, called a "C-station," is placed at the intersections of the loops to allow transfers of data between the loops.

The network of FIG. 1 is only illustrative of the many types of data network loop configurations. The geographical extent of each loop and the number of access, B, stations on each loop depends upon the information capacity of the associated loop and the loading provided by each access station. Thus, the various loops may have different channel capacities. Moreover, transmission on different loops need not be synchronous with one another; thus, the speed of transmission on different loops can vary.

In operation, data to be transmitted by the system are inserted on a loop at one of the B-stations in a standard length message block format that has associated with it an appropriate encoded destination address. This message block transverses its local loop until a C-station is reached in which a loop transfer may take place in order to deliver the message block to the designated address. If the destination is on the local loop, of course, the message will be delivered to that destination without ever leaving the local loop.

In transferring blocks of information from one loop to another, buffering is provided at the C-stations to take care of any differences in bit rates or timing. This buffer must be of an appropriate size to prevent excessive message blocking due to buffer overload. A more detailed description of the operation of a data loop network system and the apparatus which it includes may be found in the aforementioned copending application of J. R. Pierce.

Consider, e.g., a message which enters the system at B-station 11 and has as its destination a data receiver connected to B-station 12. The addresses of station 12, loop 26, and the source 11 and loop 21 addresses are included in the message block. It is desired that the message block thread its way through the various loops so as to minimize the total path length traversed and thereby effectuate faster transmission of data. If the criterion for switching between loops, utilized by the prior art, is relied upon, whenever an interconnecting loop has an address different than that of the local loop address, the data message block is transferred to the interconnecting loop. By no means does this scheme insure that optimal paths will be traversed. Of course, in a simple system such as illustrated in FIG. 1, one may readily deduce the desired path for the message block. However, typical network configurations, it may be appreciated, are far more complex.

In accordance with the principles of this invention, we insure that optimals paths are traversed by requiring that a predetermined parameter, i.e., the Hamming distance, be reduced as a necessary condition to the switching of a message block from one loop to another. The Hamming distance is defined as the number of places in which two $n$-place binary numbers differ. Thus, e.g., the Hamming distance between 011 and 100 is three, between 10 and 11 is one, and between 1011 and 1000 is two. But such a criterion is meaningless unless the loops are identified with proper binary addresses. We have discovered a method for assigning addresses to the loops of an arbitrary network such that each transfer between one loop and another, in accordance with the stated criterion, not only reduces the Hamming distance but also decreases said distance by exactly one.

Figure 2:
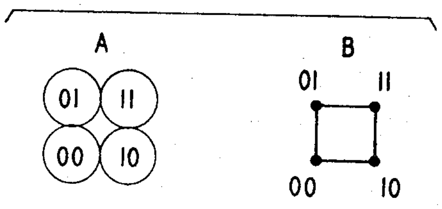
FIG. 2A depicts, abstractly, a communication loop system.
FIG. 2B depicts the graph of the loop system of FIG. 2A.

Consider, e.g., the loop system of FIG. 2A, which is abstractly depicted. Of course, "C" stations would be present at each intersection and "A" and "B" stations would be used in each loop. Each loop is simply assigned a two-digit numeral $ij, i,j=0$ or 1. Routing in accordance with the principles of this invention is accomplished by entering a new loop if the Hamming distance between where the message block is and its destination is decreased. If the Hamming distance is not decreased, no transfer is made. Thus, if it is desired to go from loop 10 to loop 11, then the total Hamming distance is 1. The transfer from loop 10 to loop 00 is not effected since this does not decrease the Hamming distance. However, the message block circulating in loop 10 will exit into loop 11 when their mutual interconnection is reached. To go from loop 10 to loop 01, either exit, i.e., to loop 00 or to loop 11, decreases the total Hamming distance, and is therefore acceptable. Thus, alternative routing along optimal paths is accomplished; if one C-station is busy, another may be used. However, the assignment of proper binary addresses to loops of a system is not obvious. Consider, e.g., a collection of loops of a system as a graph, with each loop a vertex of the graph, and two vertices connected if, and only if, the two loops have a mutual transfer point, i.e., an interconnection. The graph of FIG. 2A is shown in FIG. 2B. The graph G of any closed loop system is a connected graph. Each vertex is identified by a pair of binary digits, corresponding to its respective loop, and, because of the addressing scheme used, adjacent vertices differ in exactly one binary position. The number of edges of the graph required to traverse in passing from one vertex or loop to another is exactly the Hamming distance between the corresponding addresses, and the shortest path between two loops or vertices is achieved by following a route of decreasing Hamming distance to the desired destination.

Figure 3:
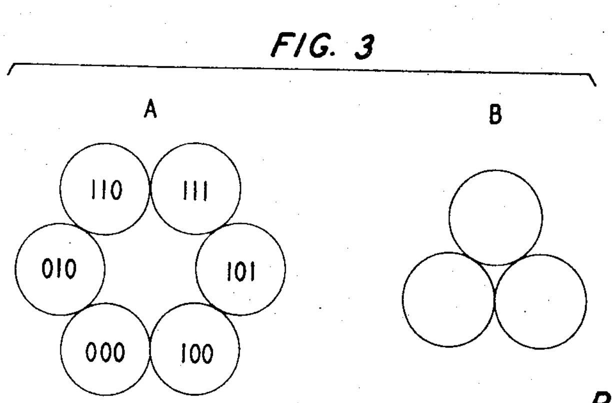
FIGS. 3A and 3B depict, abstractly, different communication loop systems.

That the addressing of loops cannot be arbitrary is indicated by the system of six cyclically arranged loops of FIG. 3A. The Hamming distance, e.g., between loops 100 and 110, is one; however, the number of intersections traversed in going from 100 to 110 is three, contrary to the desired routing criterion. Problems also arise when an odd number of loops, such as shown in FIG. 3B, must be addressed. Available two-tuple addresses are 00, 10, 11, and 01. The assignment of any three combinations of these addresses to the loops of FIG. 3B will always result in a pair of addresses which differ by a Hamming distance of two. Yet, it is clear that to go from any one loop to another, only one interconnection need be traversed.

By the practice of this invention, a third symbol is introduced, i.e., "$d$," which does not contribute to the computation of the Hamming distance. Thus, e.g., in the case of FIG. 3B, the loops may be addressed as 00, 10, and $dl$, each differing one from the other by a Hamming distance of one since $d$ contributes zero to the computation. As another example, the Hamming distance, as we have defined it, between 01$d$1$d$0 and 11$d$010 is two, with the contributions coming from the first and fourth binary positions. Of course, by definition, there is no binary bit corresponding to "$d$." But, by the practice of this invention, we realize addresses of the type described by encoding 0 as 00, 1 as 01, and $d$ as either 10 or 11. This additional bit position may be used for parity checking or other purposes if desired. Of course, many other encoding schemes are available. The general scheme for determining Hamming distances is therefore as follows: If the 2k−1 digit of both addresses is 0, indicating a 1 or 0, compute the Hamming distance between the $2k^{th}$ digits; if the $2k-1^{st}$ digit of either address is 1, disregard it since it corresponds to a "$d$;" sum the computations over all $k$ and determine if going into a new loop decreases the Hamming distance to the destination. Before discussing the mechanization of this scheme, it may be advantageous to first consider the apparatus of a typical loop system.

Figure 4:
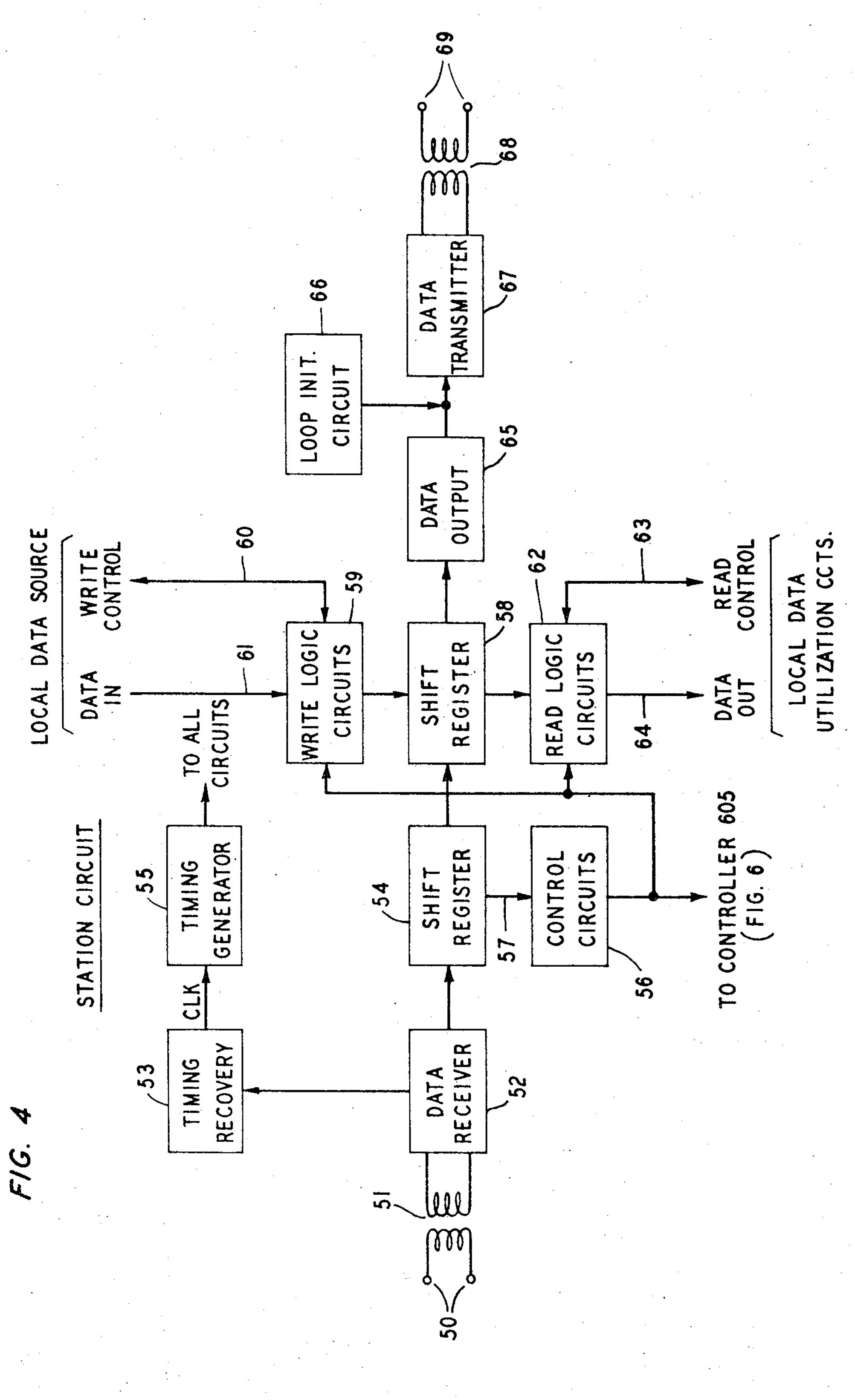
FIG. 4 is a block diagram of an "A" or "B" station circuit used in the practice of this invention.

As mentioned above, a predetermined word of each data message block comprises a loop destination code indicating the loop destination to which the message block is to be delivered. For illustrative purposes, an eight-bit code or word is reserved for this destination code. Of course, two or more words may be used for this purpose. As described in the above-cited copending application, FIG. 4 depicts a station circuit useful as an "A" or "B" station in the communication system of FIG. 1. Digital message blocks, including a destination code, traversing a loop appear at input terminals 50 and are applied via isolating transformer 51 to data receiver 52. Data receiver 52 demodulates the received signals and, if necessary, translates the binary signals to the appropriate voltage levels required for the balance of the circuits, passing the signals to timing recovery circuit 53 and shift register 54.

Timing recovery circuit 53 utilizes the pulse repetitions of the message block to synchronize a local clock in order to provide timing information for the balance of the circuits. The clock pulses thus developed are supplied to timing generator circuit 55 which provides the timing pulses required to synchronize the operations of the balance of the circuit.

Shift register 54 is a serial input, serial output, nine-bit shift register having parallel access to all of the register stages for reading purposes. Thus, the outputs of all of the stages of shift register 54 are made available to control circuits 56 by way of leads 57.

The control circuits 56 respond to the various codes in each message block to initiate and control the operation of the station circuit. Control circuits 56, for example, detect a synchronizing code, and also detect the loop destination code which is applied to controller 605 (FIGS. 5 and 6) as discussed hereinafter.

The output of shift register 54 is applied to shift register 58 which is an eight-stage, serial input, serial output shift register with both parallel reading and parallel writing facilities. Thus, write logic circuits 59, under the control of signals from control circuits 56 and signals from a local data source, via leads 60, control the serial or parallel writing of data, appearing on leads 61, into shift register 58. Similarly, read logic circuits 62, under the control of signals from control circuits 56 and signals on read control leads 63, permit the reading, in series or in parallel, of message words from shift register 58 onto data output leads 64. It can thus be seen that message blocks can be entered into and removed from the transmission loop one word at a time by way of shift register 58. This facility is particularly utilized to transfer a message block from one loop to another.

The serial output of shift register 58 is applied to data output circuit 65. In general, data output circuit 65 inserts or reinserts one-bits in guard spaces between message words.

A loop initialization circuit 66 is provided, for A-stations only, and is used to initialize the loop when message block framing is lost. In general, this is accomplished by inserting nine zeros, followed by all ones, on the loop.

The output of data output circuit 65 is applied to data transmitter 67 which may be used to modulate the data to the desired frequency range for transmission on the loop. This modulated data is transmitted by way of isolating transformer 68 and output terminals 69 to the transmission loop.

The station circuit of FIG. 4 performs all of the functions necessary for the A- or B-stations of FIG. 1. Slight modifications are required for A-station use. Clock signals, for example, may be provided from a local pulse source rather than from a timing recovery circuit 53. The read and write logic circuits 62 and 59 are not required since no data access takes place at the A-station. The loop initialization circuit 66, however, is required. Most of the balance of the circuitry of FIG. 4 can be identical in B-stations and in A-stations. Indeed, substantial manufacturing savings may be effected by constructing a single station which can be manually modified to serve as either an A-station or a B-station.

Figure 5:
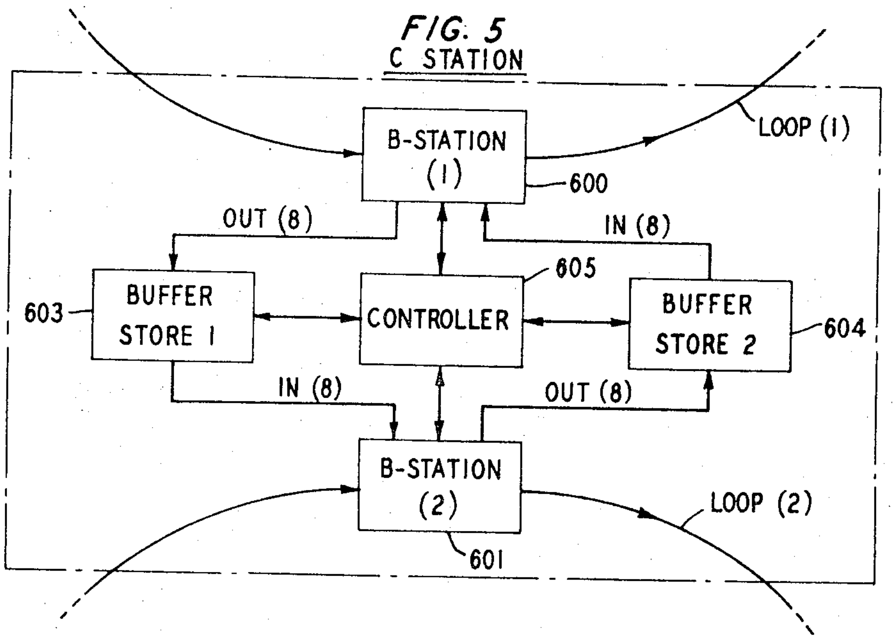
FIG. 5 is a block diagram of a "C" station circuit used in the practice of this invention.

In FIG. 5 there is shown a block diagram of a C-station, suitable for use in the data transmission network of FIG. 1, which comprises two B-stations 600 and 601. Each of B-stations 600 and 601 may be a station circuit such as that previously described and shown in FIG. 4. B-station 600 is interposed in one loop (1) while B-station 601 is interposed in another loop (2). B-station 600 delivers data to a buffer store 603 which, in turn, delivers data to B-station 601. Similarly, B-station 601 delivers data to a buffer store 604 which, in turn, delivers that data to B-station 600. A controller 605 receives control signals from B-stations 600 and 601 and issues appropriate commands to buffer stores 603 and 604.

It can be seen that the C-station of FIG. 5 allows loop (1) and loop (2) to intersect in the sense that message blocks on loop (1) can be launched on loop (2) and message blocks on loop (2) can be launched on loop (1). This is accomplished by utilizing the Hamming distance criterion to develop control signals for transferring from one loop to another. In response to such control signals, a message block is transferred by the appropriate B-station, i.e., 600 or 601, into the respective buffer store, 603 or 604. As soon as a vacant message block is detected on the loop into which the message is to be launched, the buffer store delivers the message block to the appropriate B-station, 600 or 601, for insertion into loop (1) or loop (2).

Buffer stores 603 and 604 may comprise different portions of the same memory and may have the capacity of several message blocks. Indeed, to prevent an undue number of message blocks from being lost, the size of buffer stores 603 and 604 is selected with due regard to the amount of interloop traffic to be expected. The entry of message blocks into buffer stores 603 and 604 and the removal of these message blocks from the buffer store are under the control of controller 605.

It should be noted that B-stations 600 and 601 need not be operating at the same pulse repetition rate nor in synchronism. Data is written into the buffer stores 603 and 604 under the control of timing signals from the B-station reading the message. Data is read from the buffer stores under the control of timing signals from the B-station in the loop in which the message is to be inserted. Since both B-stations are synchronized with their associated loops, a rate change is possible between the two loops. The multi-message block capacity of the buffer stores 603 and 604 permits any desired relationship between the rates in the two loops.

As previously noted, apparatus for realizing the above-described "A," "B," and "C" stations is fully described in the cited copending application of J. R. Pierce.

Figure 6:
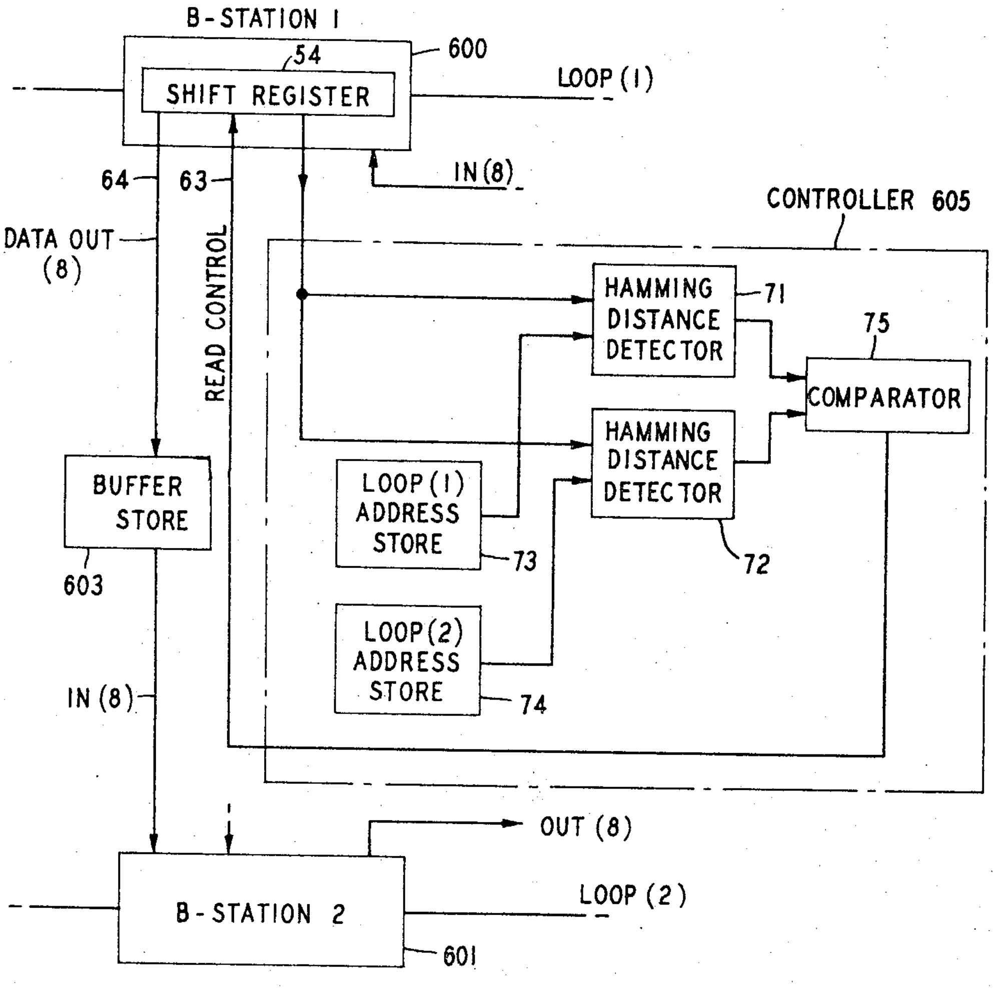
FIG. 6 is a block diagram of relevant parts of the "C" station circuit of FIG. 5.

In accordance with the principles of this invention, controller 605 also includes apparatus for determining whether a transfer should be made to an interconnecting loop and for effecting this transfer. FIG. 6 depicts a portion of the circuit of FIG. 5 to illustrate the process involved in transferring a message block from loop (1) to loop (2). Of course, an identical technique is used in transferring a message block from loop (2) to loop (1). B-station 600, includes shift register 54, as shown in FIG. 4, into which is selectively shifted the destination code of the message block. This code, i.e., sequence of bits, is applied simultaneously to Hamming distance detectors 71 and 72 by control circuits 56 (FIG. 4). Applied, respectively, to each detector, by address stores 73 and 74, are the addresses of loop (1) and loop (2) which are permanently stored in controller 605. Detector 71 develops a signal representative of the Hamming distance between the destination loop address and the loop (1) address. Detector 72 develops a signal representative of the Hamming distance between the destination loop address and the address of loop (2). If the latter distance is less than the former distance, comparator 75 develops a control signal which is applied to B-station 600 to transfer a message block to buffer store 603.

Figure 7:
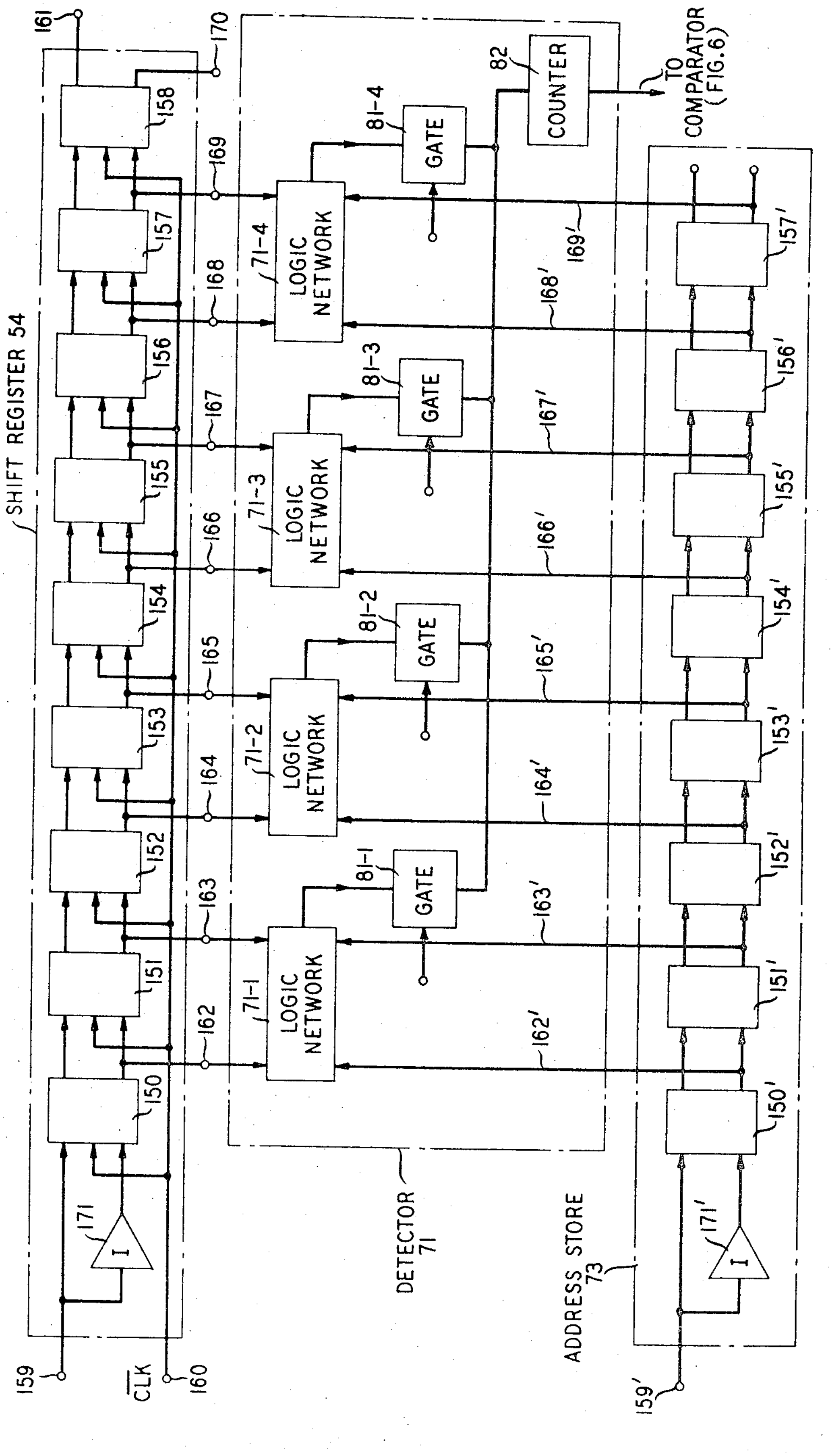
FIG. 7 is a block diagram of a shift register, Hamming distance detector, and address store used in the "C" station circuit of FIG. 6.

FIG. 7 shows in more detail shift register 54 of B-station 600, Hamming distance detector 71 and loop (1) address store 73.

Shift register 54 comprises nine binary stages, 150 through 158. Serial input data (derived from data receiver 52 in FIG. 4) appears at input terminal 159 and is applied directly to the set input of the first stage 150, and through inverter 171, to the reset input of stage 150. Inverted clock pulses (from timing recovery circuits 53 in FIG. 4) appear at terminal 160 and are applied to all of stages 150 through 158 to advance the data signals through these stages. The serial output pulses from shift register 54 appear at output terminal 161.

The individual stages 150–158 of the shift register also provide parallel output signals to output terminals 162 through 170, respectively. It is therefore apparent that data can be written into the shift register in a serial fashion from terminal 159, may be read out of shift register A in a serial fashion via terminal 161, and may be read out of shift register A in parallel by way of terminals 162 through 170. The outputs at terminals 162 through 170 are connected to control circuits 56 (FIG. 4) which are not shown. Illustratively, the first three words of each message block, as they pass through shift register 54, are applied in parallel to the control circuits to control the operation of the station. Upon detection of a destination loop code, control circuits 56 apply the eight encoded bits to detector 71 via terminals 162 through 169.

Loop (1) address store 73 may illustratively be an eight-stage shift register, similar to shift register 54, for permanently storing the address of loop (1). Of course, a plethora of well-known storage devices are available and may be used if so desired. Hamming distance detector 71 comprises a plurality of logic networks, 71–1, 71–2, 71–3, 71–4.

Each logic network, a typical one of which is shown in FIG. 8B, develops a signal proportional to the Hamming distance between two pairs of binary bits which each respectively represent one bit of the address code of the destination or loop. It will be recalled that each bit of the address code may be either a 0, 1, or "*d*" and that these are encoded as 00, 01 and, e.g., 10, respectively. An illustrative example will be described hereinafter. Logic networks 71–1, 71–2, etc., thus develop signals which represent the Hamming distance between the stored addresses. Gates 81–1, 81–2, 81–3, and 81–4 sequentially apply these signals to counter 82. Counter 82 develops a signal proportional to the total Hamming distance, which in turn is applied to comparator 75 of FIG. 6. Gates 81 are selectively actuated by a convenient source of timing signals, e.g., generator 55 of FIG. 4. Identical circuitry, not shown, is utilized to determine the Hamming distance between the destination code stored in shift register 54 and the loop (2) code of store 74, as shown in FIG. 6.

FIG. 8A is illustrative of the case where the destination loop is identified as 1011, the loop in which the message block is currently circulating is identified as *dd*00, and the identification of the connecting loop is 001*d*. The equivalent encoding of these addresses is depicted in the associated blocks which represent the contents of shift register 54 and stores 73 and 74. Note that if the first digit of each pair of bits considered is a 1, no contribution is made to the Hamming distance since a "*d*" is identified in this manner. In comparing the stored codes of register 54 and store 73, it is seen that they differ, in a contributing sense, in the last two cell pairs. Thus, the Hamming distance between the destination loop and current loop (1) is two. On the other hand, the distance between the destination loop and connecting loop (2) is one. Note that the "*d*" positions do not contribute to the final determination. Thus, the apparatus of FIG. 6 would transfer the message block from loop (1) to loop (2) since this decreases the Hamming distance between the message and its final destination.

FIG. 8B depicts a typical logic network, e.g., 71-1 of FIG. 7, for determining the distance between two pairs of encoded bits, stored in register units 150-151, 150'-151', respectively, which represent one position of the address codes. If the first bit of each pair of bits is a 0, indicating either a 0 or a 1 in the address code, the output of NOR circuit 41 is a logical 1. However, if a "*d*" is present, one or both of the inputs to NOR circuit 41 will be a 1, thereby developing a logical 0 output. The output of NOR circuit 41 is applied to AND circuit 43 which will be inhibited by a logical 0 output from NOR circuit 41. Thus, no output is developed by logic network 71-1 when a "*d*" is present in the address code. Half adder, exclusive OR, circuit 42 is responsive to the second bit of each pair of codes and develops a 1 output only when the two applied bits differ. Thus, AND circuit 43 develops an output only when the addresses differ in accordance with the Hamming criterion.

Fundamental to the operation of the present system is the proper addressing of loops so that a transfer between one loop and another loop, which decreases the Hamming distance, also insures that a shortest or optimal path will be traversed by the message block. More than one path may be optimal, therefore, allowing for alternative routing. Consider, e.g., the loop system of FIG. 1, depicted in FIG. 9A, and its associated abstract graph shown in FIG. 9B. Each connection between loops is designated in the graph by a line connecting alphabetically identified vertices, A, B, C, etc., which represent the various loops. We have discovered a machine implementable process for addressing the *n*, a predetermined arbitrary number, loops of a communication system which insures that the above-mentioned criterion is satisfied. Furthermore, our algorithm, disclosed below, provides an address of length, L, less than or equal to the number *n* of loops minus one, i.e., $L \leq n-1$, with no exceptions. It will be apparent that our algorithm is readily programmable by a programmer of ordinary skill in the art. Accordingly, no program listing is included. The general algorithm is first disclosed, and then applied to the loop system of FIGS. 1 and 9.

Number the *n* vertices of an abstract graph G, representing a communication loop system, with integers $\{1, 2, \ldots, n\}$ so that for $k > 1$, the vertex numbered *k* is adjacent to a vertex with a smaller number. Since G is connected, this is always possible. Let $v(k)$ denote the vertex to which *k* has been assigned.

Assign the initial partial addresses of 0 to $v(1)$ and 1 to $v(2)$. Of course, other initial addresses may be assigned if so desired. Partially address the next vertex $v(3)$ and append to the addresses for $v(1)$ and $v(2)$ one or more bits in accordance with the following general method of assignment.

Assume addresses have been assigned to $v(1), \ldots, v(k)$, e.g., $A(i)$ has been assigned to $v(i)$, so that $D_{ij} = D_H(A(i),A(j))$, $1 \leq i < j \leq k$, where $D_H$ denotes the Hamming distance between addresses $A(i)$ and $A(j)$, and $D_{ij}$ denotes the minimum distance between $v(i)$ and $v(j)$ in G. Determine an address $A(k+1)$ for the next vertex $v(k+1)$, of the same length as the preceding partial addresses, $A(i)$, for example, consonant with the requirement that $$\max_{1 \leq i \leq k} (D_{i,k+1} - D_H(A(i), A(k+1))) = m_{k+1} \quad (1)$$

is as small as possible under the constraint $$\min_{1 \leq i \leq k} (D_{i,k+1} - D_H(A(i), A(k+1))) \geq 0. \quad (2)$$

Of course, an address that always satisfies (2) is an address of all "*d*"s. Typically, however, $A(k+1)$ may be chosen so that $m_{k+1} = 1$. In fact, this may usually be accomplished by choosing $A(k+1)$ to be a slightly perturbed copy of some $A(l)$, i.e., the address of a vertex $v(l)$ adjacent to $v(k+1)$.

After $A(k+1)$ has been chosen, $m_{k+1}$ symbols are adjoined to each of the partial addresses $A(i)$, $i \leq i \leq k+1$. To $A(k+1)$ adjoin $m_{k+1}$ "1"s. To $A(i)$ adjoin $m_{k+1} - (D_{i,k+1} - D_H(A(i),A(k+1)))$ "*d*"s and $(D_{i,k+1} - D_H(A(i),A(k1)))$ "0 s." It is easily shown that for the new augmented addresses $A'(i)$, $1 \leq i \leq k+1$, $D_{i,j} = D_H(A'(i), A'(j))$, $1 \leq i < j \leq k+1$, i.e., the distance between two vertices is equal to the Hamming distance between their respective addresses.

As an illustrative example, the above addressing algorithm will be applied to the graph of FIG. 9B, representing the loop system of FIGS. 9A and 1. FIG. 9C depicts said graph with its vertices numbered such that each vertex is adjacent to some other vertex with a smaller number. FIG. 9D is a distance matrix for the graph of FIG. 9C which conveniently expresses the distance $D_{i,j}$ between two vertices, $v(i)$ and $v(j)$. Thus, the minimum distance between vertex $v(3)$ and $v(6)$, e.g., is two, as indicated by the row and column intersection of the respectively identified vertices. A distance matrix of the type depicted is readily generated for any connected graph by techniques well known to those skilled in the programming art. Of course, in the simple case considered, it may be constructed manually.

Partial addresses are assigned to vertices 1 and 2.

| vertex | address |
|---|---|
| 1 | 0 |
| 2 | 1 |

Constructing an address for vertex $v(3)$, it is seen that any partial address of length one will result in $m_3 = 1$. Choose 0.

| vertex | address |
|---|---|
| 1 | 0 |
| 2 | 1 |
| 3 | 0 |

Adjoin $m_3 = 1$ "1's" to A(3) and augment A(1) and A(2) in accordance with the general algorithm.

| vertex | address |
|---|---|
| 1 | 0 0 |
| 2 | 1 *d* |
| 3 | 0 1 |

Construct an address for vertex $v(4)$, choosing, e.g., a partial address of 01, calculate $m_4 = 1$, and augment the partial addresses in accordance with the algorithm.

| vertex | address |
|---|---|
| 1 | 00 0 |
| 2 | 1*d* 0 |
| 3 | 01 0 |
| 4 | 01 1 |

Repeat the proceeding steps two more times, each time resulting in $m_5 = 1$ and $m_6 = 1$, with partial addresses of A(5) = 011 and A(6) = 1*d*1*d*.

| vertex | address |
|---|---|
| 1 | 000 0 |
| 2 | 1*d*0 *d* |
| 3 | 010 0 |
| 4 | 011 0 |
| 5 | 011 1 |

The final addresses are:

| vertex | address |
|---|---|
| 1 | 0000 *d* |
| 2 | 1*d*0*d* *d* |
| 3 | 0100 *d* |
| 4 | 0110 0 |
| 5 | 0111 *d* |
| 6 | 1*d*1*d* 1 |

Thus, for a system having $n = 6$ loops, i.e., a graph having 6 vertices, the length of each address is $n - 1$, i.e., 5.

It is to be understood that the embodiments shown and described herein are illustrative of the principles of this invention and that modifications may be implemented by those skilled in the art without departing from the scope and spirit of the invention. For example, many loop configurations will not be arbitrary collections of loops, but will have a hierarchical structure as discussed in the above-cited Pierce application. It is thus possible to modify the routing algorithm and effectively take advantage of a natural "product" construction. In a hierarchical system, loops are partitioned into three classes — national, regional and local. The address portion of the message is subdivided into three corresponding portions. The routing algorithm now consists of three steps: (i) First apply the disclosed Hamming distance algorithm to the "national" portions of the sending and destination addresses; (ii) When the distance in (i) becomes zero, then apply the Hamming distance algorithm to the "regional" portions of the addresses; (iii) Finally, when the distance in (ii) is zero, apply the Hamming distance algorithm to the "local" portions of the address.

This scheme combines the efficiency of the Hamming distance algorithm with the savings in address lengths resulting from the hierarchical structure. In a particular example, a loop network had 44 local vertices. Using direct Hamming algorithm addressing, addresses having a length of around 59 are expected. By distinguishing national, regional and local loops, with a small additional computing cost in routing (several extra conditional transfers) addresses of length ≤ 11 were obtained. Moreover, to add additional local stations to a regional station, it is a very simple matter to modify just the neighboring local addresses to obtain a correct addressing for the augmented network.

What is claimed is:

1. In an interconnecting loop digital transmission system wherein a predetermined portion of each transmitted message block circulating in a loop includes a destination loop address code and each loop has an assigned address code, the improvement comprising:

first means for developing a first signal representative of a predetermined binary relationship between the address code of the loop in which said message block is circulating at a given point in time and the address code of said destination loop;

second means for developing a second signal representative of a predetermined binary relationship between the address code of a loop interconnecting with said loop in which said message block is circulating and the address code of said destination loop;

and third means responsive to said first and second signals for transferring said message block to said interconnecting loop when said second signal is less than said first signal.

2. The system as defined in claim 1 wherein said first means develops a first signal representative of the Hamming distance between said address code of the loop in which said message block is circulating and said destination loop address code;

said second means develops a second signal representative of the Hamming distance between said interconnecting loop address code and said destination loop address code;

and said third means includes means responsive to said first and said second signals for developing a transfer signal when said second signal is less than said first signal.

3. The system as defined in claim 2 wherein said first and second means each comprises:

a plurality of logic networks, each responsive to a predetermined number of bits of said destination loop address code and one of said other loop address codes, for developing signals representative of said Hamming distance.

4. The system as defined in claim 3 wherein each of said logic networks comprises:

a first logic NOR circuit responsive to said code bits;

a second logic half adder circuit responsive to said code bits;

and a third logic AND circuit responsive to the output signals of said first and second logic circuits.

5. In an interconnecting loop digital transmission system wherein a predetermined portion of each transmitted message block circulating in a loop includes a destination loop address code and each loop has an assigned address code, the improvement comprising:

means for developing a signal representative of the Hamming distance between the address code of the loop in which said message block is circulating and said destination loop address code, said Hamming distance being indicative of the message path length to said destination loop;

and means responsive to said representative signal for selectively transferring said message block to an interconnecting loop when said transfer would reduce said Hamming distance, thereby minimizing the transmission path of said message block in traversing between said loop in which said message is circulating and said destination loop.

6. In an interconnecting loop digital transmission system having apparatus for detecting destination loop address codes in each transmitted digital signal message block circulating in a loop and apparatus for transferring message blocks to interconnecting loops, the improvement comprising:

means for determining the Hamming distance between said loop destination address code and the address code of the loop in which said message block is circulating;

and means for effecting a transfer of said message block to an interconnecting loop when said transfer would decrease said Hamming distance.

7. The system as defined in claim 6 further comprising:

first means for developing a first signal representative of the Hamming distance between said loop address code of said circulating message block and said destination loop address code;

second means for developing a second signal representative of the Hamming distance between the address code of said interconnecting loop and said destination loop address code;

and third means responsive to said first and said second signals for effecting said transfer when said second signal is less than said first signal.

8. The system as defined in claim 7 wherein said first and second means each comprises:

a plurality of logic networks, each responsive to a predetermined number of bits of said destination loop address code and one of said other loop address codes, for developing signals representative of said Hamming distance.

9. The system as defined in claim 8 wherein each of said logic networks comprises:

a first logic NOR circuit responsive to said code bits;

a second logic half adder circuit responsive to said code bits;

and a third logic AND circuit responsive to the output signals of said first and second logic circuits.

10. In an interconnecting loop digital transmission system having apparatus for detecting destination loop address codes in each transmitted digital signal message block circulating in a loop and apparatus for transferring message blocks to interconnecting loops, each loop having a predetermined address code, the improvement comprising:

means for determining a first Hamming distance between said loop destination address code and the address code of the loop in which said message block is circulating and a second Hamming distance between said loop destination address code and an interconnecting loop address code;

and means for effecting a transfer of said message block to said interconnecting loop when said second Hamming distance is less than said first Hamming distance.

11. In an interconnecting loop digital transmission system wherein a predetermined portion of each transmitted message block circulating in a loop includes a destination loop address code and each loop has an assigned address code, the improvement comprising:

means for developing a first signal representative of a predetermined function of said loop destination address code and the address code of the instant loop in which said message block is circulating, said first signal being indicative of the number of loops to be traversed in reaching said destination loop from said instant loop;

means for developing a second signal representative of a predetermined function of said loop destination address code and the address code of a loop interconnecting with said instant loop, said second signal being indicative of the number of loops to be traversed in reaching said destination loop from said interconnecting loop;

and means responsive to said first and second signals for selectively transferring said message block to said interconnecting loop if such a transfer would reduce the number of loops traversed by said message block in reaching said destination loop.

12. In an interconnecting loop digital transmission system wherein a predetermined portion of each transmitted message block circulating in a loop includes a destination loop address code and each loop has an assigned address code, the improvement comprising:

means for developing a first signal representative of a first predetermined function of said loop destination address code and the address code of the current loop in which said message block is circulating;

means for developing a second signal representative of a second predetermined function of said loop destination address code and the address code of a loop interconnecting with said current loop;

and means responsive to said first and second signals for selectively transferring said message block to said interconnecting loop when said second function has a value less than said first function.

13. Interconnecting loop digital transmission apparatus comprising:

means for determining the Hamming distance between a destination loop address code of a circulating message block and an address code of a loop in which said message block is circulating;

and means for transferring said message block to an interconnecting loop when such transfer would decrease said Hamming distance.

14. Interconnecting loop digital transmission apparatus wherein each loop has a preassigned address code comprising:

means for determining the Hamming distance between the destination loop address code of a circulating message block and the address code of the loop in which said message block is circulating;

and means for selectively transferring said message block to an interconnecting loop when said Hamming distance would be reduced.

15. The apparatus defined in claim 14 further comprising:

first means for developing a first signal representative of the Hamming distance between the loop address code of said circulating message block and said destination loop address code;

second means for developing a second signal representative of the Hamming distance between an interconnecting loop address code and said destination loop address code;

and third means responsive to said first and said second signals for activating said transferring means when said second signal is less than said first signal.

16. The apparatus defined in claim 15 wherein said first and second means each comprises:

a plurality of logic networks, each responsive to a predetermined number of bits of said destination loop address code and one of said other loop address codes, for developing signals proportional to said Hamming distance.

17. The apparatus as defined in claim 16 wherein each of said logic networks comprises:

a first logic NOR circuit responsive to said code bits;

a second logic half adder circuit responsive to said code bits;

and a third logic AND circuit responsive to the output signals of said first and second logic circuits.

* * * * *